United States Patent

Perkins et al.

[15] 3,659,286

[45] Apr. 25, 1972

[54] DATA CONVERTING AND CLOCK PULSE GENERATING SYSTEM

[72] Inventors: Carroll R. Perkins, Balboa Island; Everett L. Shaffstall, Fountain Valley; Robert N. Yoder, Huntington Beach; James L. Gundersen, Carson, all of Calif.

[73] Assignee: Hughes Aircraft Company, Culver City, Calif.

[22] Filed: Feb. 2, 1970

[21] Appl. No.: 7,482

[52] U.S. Cl. ....................... 340/347 DD, 307/304, 325/38 R, 340/174.1 A

[51] Int. Cl. ....................................... H03k 13/24, H04h 3/00

[58] Field of Search .............. 340/347 DD, 174.1 G, 174.1 A, 340/174.1 B; 235/154; 328/34, 55; 325/38, 141, 321; 178/66, 67; 307/304

[56] References Cited

UNITED STATES PATENTS

| | | | |
|---|---|---|---|
| 3,361,978 | 1/1968 | Fiorini | 325/38 R UX |
| 3,349,389 | 10/1967 | Simanavicius | 235/154 X |
| 3,493,962 | 2/1970 | Vallee | 340/347 |
| 3,537,100 | 10/1970 | Barjot et al. | 340/347 |

*Primary Examiner*—Maynard R. Wilbur
*Assistant Examiner*—Michael K. Wolensky
*Attorney*—James K. Haskell and Paul M. Coble

[57] ABSTRACT

A system, including a data regenerator, for converting split phase Manchester encoded binary data into NRZ data and for generating clock pulses which are synchronized with the NRZ data is disclosed. MOS FETs are used throughout the system. The data regenerator includes two transition detectors which detect logic 0 level to logic 1 level transitions in the split phase Manchester encoded data and in its complement, and produce pulses in response to the detected transitions. The data regenerator also includes four gates which are controlled by the output of a delay unit. The delay unit is activated by the output of a bit time pulse generator, which responds to the outputs of two of the four gates. When the gates are enabled, a pulse from a transition detector passes through one of these two gates to the bit time pulse generator, causing the latter to produce a pulse which activates the delay unit. The total delay provided by the pulse generator and the delay unit is such that the output of the delay unit disables the gates for at least ½ bit period, after which the gates are again enabled to respond to a subsequent pulse from one of the detectors. The pulse generator thus provides a sequence of pulses which are synchronized with mid bit time transitions in the Manchester encoded data. Output pulses from one of the other two of the four gates are applied to the set input to a flip-flop, while the output pulses from the other of these two gates are applied to the reset input to the flip-flop, the output of which represents the regenerated NRZ data.

10 Claims, 7 Drawing Figures

INVENTORS.
CARROLL R. PERKINS,
EVERETT L. SHAFFSTALL,
ROBERT N. YODER,
JAMES L. GUNDERSEN,
BY
Paul M. Coble
ATTORNEY.

DATA CONVERTING AND CLOCK PULSE GENERATING SYSTEM

BACKGROUND OF THE INVENTION

1. Field of the Invention

The present invention relates to digital circuitry and, more particularly, to circuitry for converting split phase Manchester encoded binary data into binary data with a non-return-to-zero (NRZ) waveform and for generating clock pulses synchronized with the NRZ data.

2. Description of the Prior Art

There are various applications in which it is desired to convert split phase Manchester encoded binary data into binary data with an NRZ waveform. As used herein, split phase Manchester encoded data has a waveform with a transition from a logic 0 level to a logic 1 level at the middle of a bit time associated with a binary 1, while a transition from a logic 1 level to a logic 0 level occurs at the middle of a bit time associated with a binary 0. An insignificant transition is present at the time between successive bit times associated with bits having the same binary value.

In such applications shift registers of the type in which each stage comprises a master section and a slave section are often employed. For proper clocking of such a stage, a clock pulse CP and its complement $\overline{CP}$ are required. The CP causes the data content of the stage to be transferred from the master section to the slave section, while $\overline{CP}$ advances the data from the slave section to the master section of the next stage. For proper data shifting it is important to insure that CP and $\overline{CP}$ do not clock the stage simultaneously, for such undesired clocking may result in loss of data.

Heretofore, circuitry capable of regenerating NRZ data from midphase Manchester encoded data, hereafter referred to as midphase encoded data, and/or capable of providing appropriate clock pulses CP and $\overline{CP}$ for shift register clocking are quite complex and expensive. This is particularly the case if relatively high speed performance, e.g., 5Mc frequencies, is required. Also, such circuits often use discrete components which greatly increase the size and weight of the overall circuit or system, a marked disadvantage where the system is to be incorporated aboard an airborne vehicle wherein space and weight are of a premium.

OBJECTS AND SUMMARY OF THE INVENTION

It is a primary object of the present invention to provide new and improved system for converting midphase Manchester encoded binary data into NRZ binary data.

Another object of the present invention is to provide a system employing integrated circuits to regenerate NRZ binary data from midphase encoded data and to provide clock pulses synchronized with the NRZ data.

A further object of the invention is to provide a high speed integrated circuit, operable at frequencies around 5Mc, for providing clock pulses and their complements.

Still a further object of the invention is to provide a system utilizing integrated circuits and which is operable at high frequencies, including 5Mc, to convert midphase encoded data into NRZ data.

Briefly, in the system of the present invention, a pair of complementary input waveforms containing split phase Manchester encoded binary data are applied to first and second transition detectors, respectively. Each detector provides pulses corresponding to particular input waveform transitions, such as from a logic 1 level to a logic 0 level. Pulse generating and delay circuitry is coupled in a feedback loop with a plurality of control gates which are fed by the transition detectors to control these gates to provide output pulses which correspond to the pulses produced by the transition detectors in response to transitions occurring only at mid bit times of the Manchester encoded binary data. Control gate output pulses are employed to set and reset a bistable circuit whose output represents the input data in NRZ form. Pulses synchronized with those applied to the bistable circuit are used to activate a clock pulse generator which provides clock pulses and complementary clock pulses having a minimum of clocking level overlap.

Additional objects, advantages and characteristic features of the invention will become apparent from the following detailed description of a preferred embodiment of the invention when considered in conjunction with the accompanying drawings.

DESCRIPTION OF A PREFERRED EMBODIMENT

Figure 1:
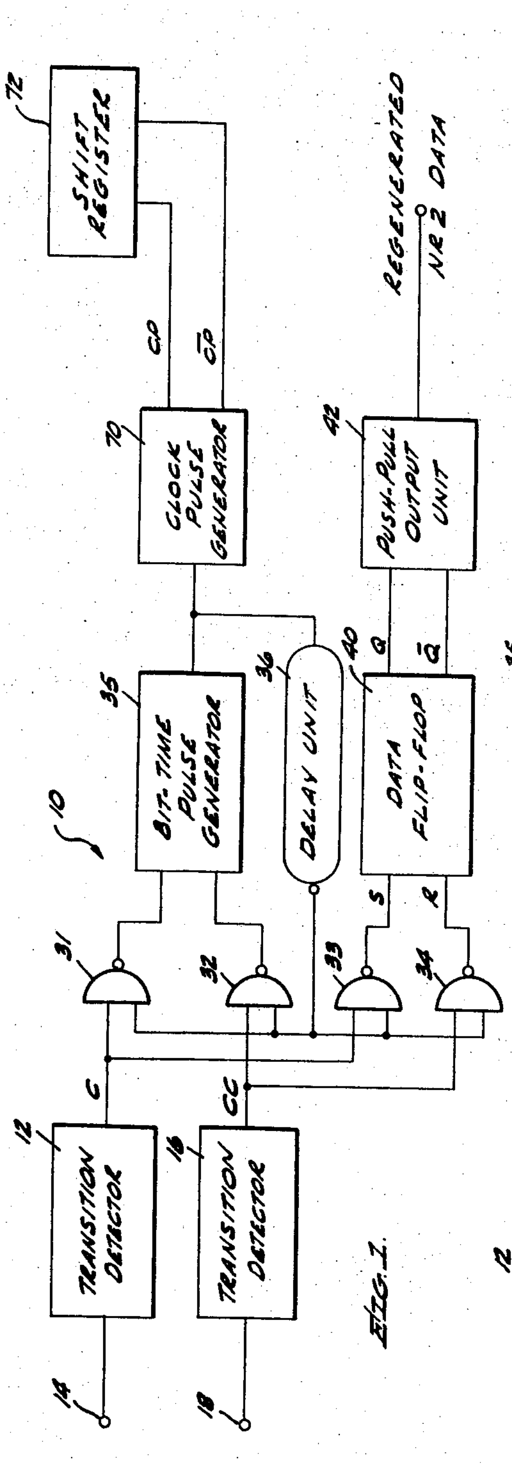
FIG. 1 is a simplified block diagram illustrating a system according to the present invention.

Referring to FIG. 1 with greater particularity, a system according to the present invention is designated generally by numeral 10. The system comprises a first transition detector 12 which is connected to a first input terminal 14, and a second transition detector 16 connected to a second input terminal 18. Split phase encoded data, such as exemplified by waveform 20 in line *c* of FIG. 2, and the complement form of this data, as represented by waveform 22 on line *d*, may be applied to input terminals 14 and 18, respectively.

Figure 2:
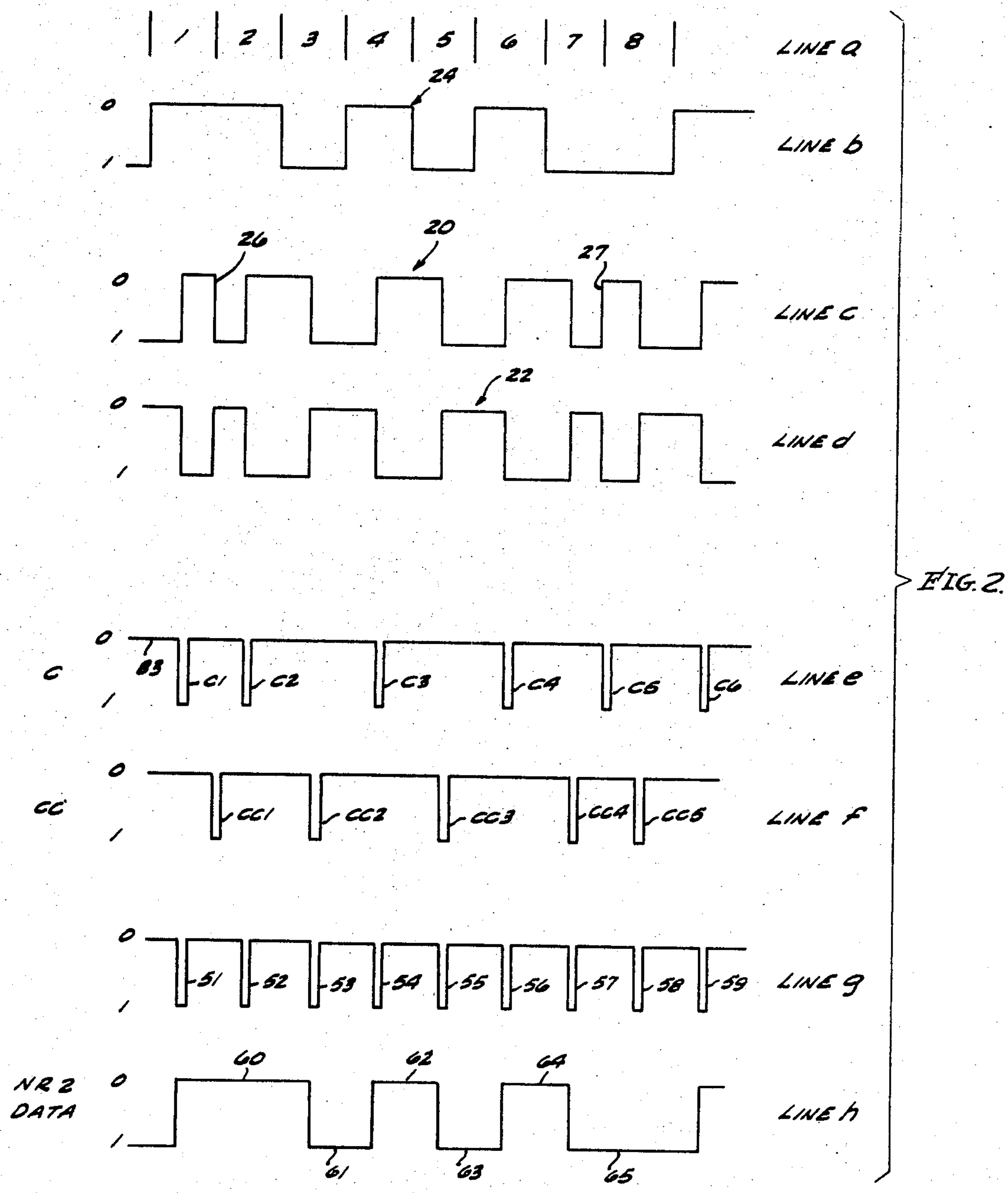
FIG. 2 shows timing waveforms at the input or output to various stages, or units, of the system of FIG. 1.

Line *a* of FIG. 2 represents bit times of a succession of eight data bits, which are diagrammed in the NRZ form as waveform 24 in line *b*. As illustrated, the data stream consists of exemplary bit values 00101011. As shown in line *c*, the midphase encoded data has a mid-bit transition from a 1 level to a 0 level for each bit value equal to a binary 0, while a mid-bit transition from a 0 to a 1 occurs for each bit value equal to a binary 1. In addition, transitions such as those designated by numerals 26 and 27 occur at times between successive bit times associated with bits of the same binary value. Complementary transitions are shown in waveform 22 (line *d*).

In operation, detector 12 (FIG. 1) senses the 1 to 0 transitions in waveform 20 and provides a pulse in response to each such transition. The output pulses from detector 12 are shown in line *e* of FIG. 2. These pulses, which hereafter will be referred to as C pulses, are designated C1–C6. It should be seen that except for pulse C5 all the other C pulses are due to mid-bit 1 to 0 transitions. Likewise, detector 16 senses the 1 to 0 transitions in waveform 22 and provides an output pulse CC for each such transition. The output pulses from detector 16 are designated CC1–CC5. All of the CC pulses except CC1 are in response to mid-bit transitions. The duration of each C or CC pulse is significantly less than ½ bit time.

The C pulses from detector 12 are supplied to one input of each of NAND gates 31 and 33, while the CC pulses from detector 16 are supplied to one input of each of NAND gates 32 and 34. Each of gates 31–34 has another input connected to the output of a bit-time pulse generator 35 through an inverting delay unit 36. The outputs of gates 31 and 32 are supplied to pulse generator 35.

Basically, the function of inverting delay unit 36 is to provide sufficient delay in conjunction with generator 35 to enable the NAND gates 31 and 33 to respond to each C pulse only if the C pulse follows a CC pulse from detector 16 by more than ½ bit time, and to enable the NAND gates 32 and 34 to respond to each CC pulse only if the CC pulse follows a C pulse from detector 12 by more than ½ bit time. Initially, all four NAND gates 31–34 are enabled. When the leading edge of an output pulse from one of the detectors, such as pulse C1 from detector 12, is received gate 31 activates generator 35. After a slight delay generator 35 provides a pulse, the leading edge of which activates delay unit 36. After an additional delay from unit 36, the NAND gates are disabled.

The total delay provided by pulse generator 35 and delay unit 36 in response to the leading edge of a pulse, while longer than the duration of a C or a CC pulse, is selected so as not to exceed ½ bit time. Thus, within not more than ½ bit time after the leading edge of pulse C1, the gates 31–34 are /disabled. However, since the trailing edge of pulse C1 occurs while the gates are still enabled, this trailing edge passes through gate 31 to generator 35 where, after a slight delay, the trailing edge of a corresponding pulse is produced. This trailing edge activates the delay unit 36 to enable the gates 31–34 after a further delay. The total delay provided by generator 35 and delay unit 36 in response to the trailing edge of a pulse is chosen to be not less than ½ bit time. Consequently, a CC pulse which appears exactly ½ bit time after a C pulse is inhibited from passing through gates 32 and 34. Similarly, a C pulse which appears ½ bit time after a CC pulse is inhibited from passing through gates 31 and 33. The foregoing delay characteristics, provided by a particular embodiment of the invention utilizing MOS elements, will be explained in detail hereafter in connection with FIG. 7.

As previously explained, the pulse generator 35 operates to provide an output pulse in response to each pulse which is supplied thereto through either gate 31 or gate 32. The system further includes a data flip-flop (FF) 40 which is set by each pulse from gate 33 and is reset by each pulse from gate 34. The two outputs from FF40, designated Q and $\overline{Q}$, are supplied to a push/pull output unit 42 which provides an output of a first level, such as a logic 0, when the flip-flop is set and an output of a second level, such as logic 1, when the flip-flop is reset. It is the output of unit 42 which represents the regenerated NRZ data.

The foregoing description will now be summarized in conjunction with lines *e*, *f*, *g* and *h* of FIG. 2. Line *g* illustrates the output pulses from pulse generator 35, while line h shows the NRZ data output of unit 42. Assuming that prior to C1 the NAND gates 31–34 are enabled, when C1 is produced by detector 12 its leading edge passes through gate 31 causing generator 35 to provide a corresponding pulse 51 (line *g*). The leading edge of pulse 51 activates the inverting delay unit 36 to disable the gates 31–34 not later than ½ bit time after the occurrence of the leading edge of pulse C1. Also, the leading edge of pulse C1 passes through gate 33 which sets FF40. Consequently, the output from unit 42 is at a logic 0 level, as represented by numeral 60 (line *h*).

Pulse CC1 is provided by detector 16 ½ bit time after the occurrence of pulse C1. Consequently, when the leading edge of pulse CC1 occurs, the gates 31–34 are disabled. As a result, the leading edge of pulse CC1 is inhibited from affecting either gate 32 or gate 34; therefore, generator 35 does not provide a pulse which corresponds to CC1, and the flip-flop 40 remains in a set condition.

Since the trailing edge of pulse C1 occurs before the gates 31–34 have been disabled, it passes to generator 35 to produce the trailing edge of pulse 51 which, after passing through delay unit 36, re-enables the gates 31–34. The total delay in this case is not less than ½ bit time to insure that the gates 31–34 are re-enabled after the trailing edge of pulse CC1, which occurs ½ bit time after the trailing edge of pulse C1. Thus, in response to the leading edge of pulse C1, the gates 31–34 are disabled after a delay of not more than ½ bit time; while in response to the trailing edge of pulse C1, the gates 31–34 are re-enabled after a delay of not less than ½ bit time. Such delays insure that the gates 32 and 34 are disabled during the entire duration of pulse CC1. Assuming a bit pulse rate of 5Mc, so that each bit time is 200 nanoseconds (ns), the required respective delays are not more than 100ns and not less than 100ns. A delay of exactly 100ns satisfies both delay requirements.

When pulse C2 is produced by detector 12, one bit time after the occurrence of pulse C1, gate 31 passes pulse C2 to the generator 35 which produces a corresponding pulse 52. Pulse C2 also passes through gate 33 to the set input to FF40. However, since FF40 is already in the set condition, the output level of unit 42 remains at the logic 0 level. When pulse CC2 is generated by detector 16, one bit time after pulse C2, the gates 31–34 are again in an enabled condition. Consequently, pulse CC2 passes through gate 32 and activates generator 35 to provide a pulse 53. Pulse CC2 also passes through gate 34 to reset FF40, so that unit 42 provides an output representative of a logic 1 level, as shown by numeral 61 (line *h*).

Successive pulses C3, CC3, C4 and CC4 activate generator 35 to provide respective pulses 54, 55, 56 and 57, while FF40 is switched between its set and reset states as represented by the levels of the output of unit 42 designated by numerals 62–65 in line h. Since pulse C5 is generated by detector 12 only ½ bit time after the occurrence of pulse CC4, the gates 31–34 are disabled when pulse C5 occurs. Hence pulse C5 does not change the state of FF40, nor does it cause generator 35 to produce an output pulse. However, when pulse CC5 is generated, one bit time after pulse CC4, the gates 31–34 are enabled, and pulse CC5 causes generator 35 to produce pulse 58. Pulse CC5 also passes through gate 34 to the reset input to FF40. However, since FF40 is already in its reset state its state does not change. The state of FF40 does change one bit time later when pulse C6 is passed by gate 33 to the set input to FF40. Pulse C6 also passes through gate 31 to cause generator 35 to provide pulse 59.

From the foregoing it should be appreciated that the system of the present invention is capable of distinguishing between significant transitions in midphase encoded data (which occur at the middle of each bit time) and insignificant transitions (which occur at times between successive bit times) in order to regenerate NRZ data (line *h*) which is the same as the original NRZ data (line *b*) from which the midphase encoded data was generated. Also, the system provides a sequence of pulses (line *g*) which are synchronized with the commencement of each bit time of the regenerated NRZ data. As will be explained hereafter in detail, the system may be implemented with metal oxide semiconductor field effect transistors, hereafter referred to as MOS elements, which are interconnected in a novel manner to provide the necessary delays in the system, including the delays of generator 35 and unit 36 as well as delays in the transition detectors 12 and 16.

As shown in FIG. 1, the output pulses from generator 35 are supplied to a clock pulse generator 70 which provides a sequence of clock pulses (CP) and their complements $\overline{CP}$ which may be applied to a multistage shift register 72 which is not considered to be part of the system 10. Each stage of the shift register may include a master section and a slave section. A CP causes each master section to transfer data to its associated slave section, while each $\overline{CP}$ results in the shifting of data from each slave section to the master section of the next stage.

In FIG. 2, line *g*, the output pulses from generator 35 are shown to have an idealized duration which is less than a 50 percent duty cycle. In practice, however, these pulses have an approximately 50 percent duty cycle duration, as shown in line a of FIG. 3, the CP and $\overline{CP}$ pulses being illustrated in respective lines *e* and *g* of FIG. 3. As will be explained in detail hereafter, the clock pulse generator 70 may be implemented with several additional MOS elements which are interconnected so as to minimize the time intervals during which a CP and its complement $\overline{CP}$ are both at a clocking level.

Figure 3:
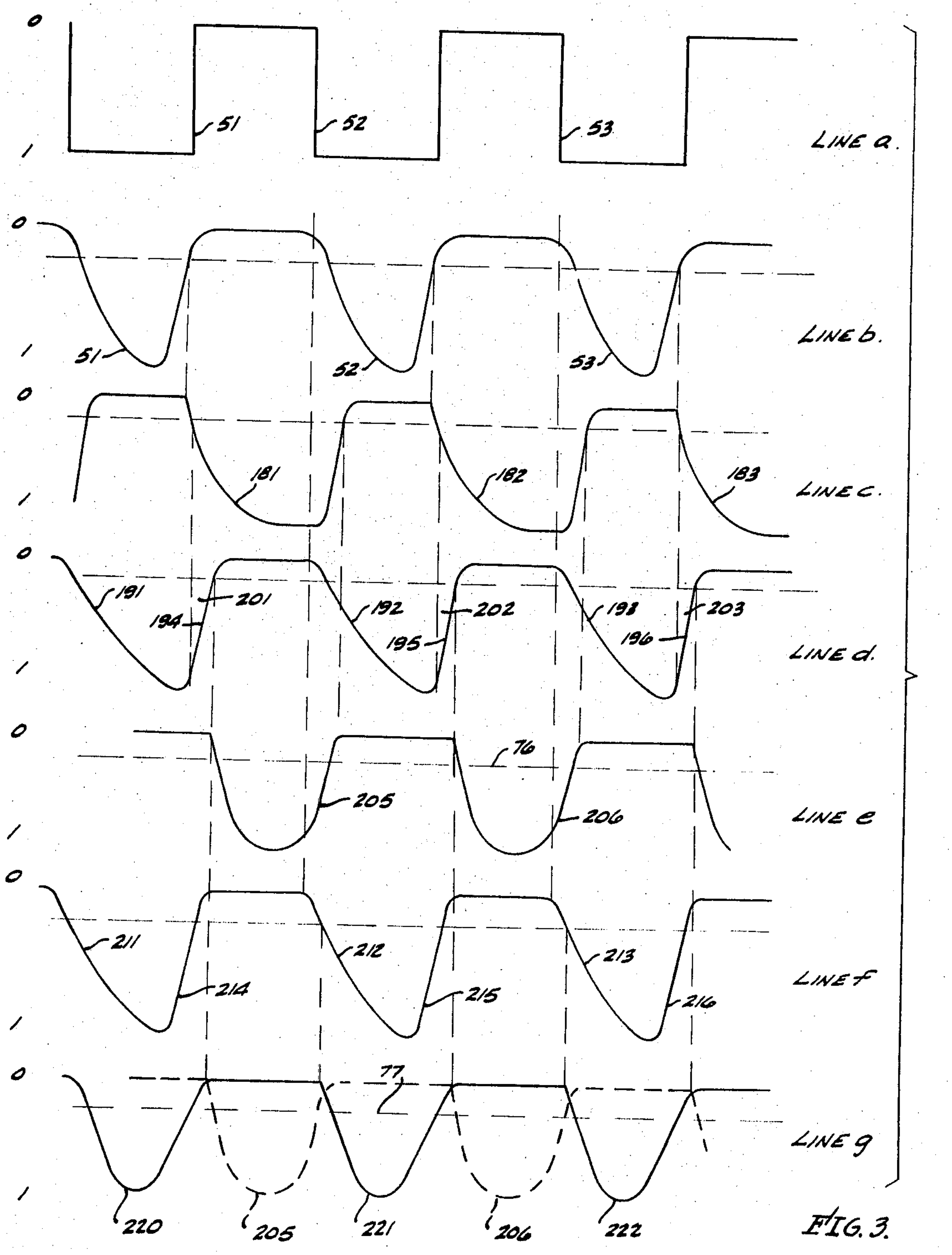
FIG. 3 shows timing waveforms at various points in the clock pulse generator portion of the system of FIG. 1.

In FIG. 3, line *a*, the pulses from generator 35 are represented as negative pulses, or logic 1 pulses. Hereafter, the clocking levels of CP and $\overline{CP}$ are assumed to be levels below the logic 0 level designated by dashed lines 76 and 77 in lines *e* and *g*, respectively, of FIG. 3. The minimization of the time intervals during which the clocking pulses CP and $\overline{CP}$ are below the levels 76 and 77 is desirable to prevent any loss of stored data in the shift register 72 due to simultaneous clocking of both sections (master and slave) of each register stage.

Figure 4:
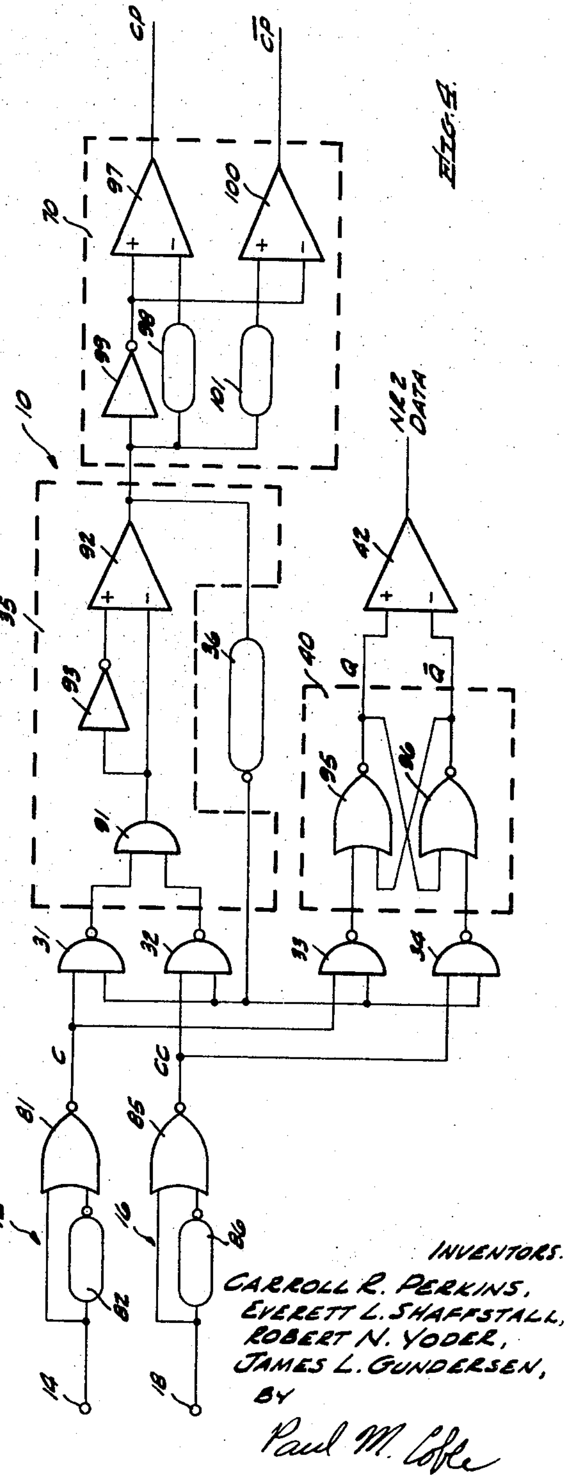
FIG. 4 is a more detailed block diagram of the system of FIG. 1.

Before proceeding with a description of an implementation of the aforedescribed circuitry using MOS elements, reference is made to FIG. 4 which is a more detailed block diagram of the system 10 of FIG. 1, and wherein elements are designated by the same numerals as like elements in FIG. 1. In FIG. 4 transition detector 12 is shown as comprising a NOR gate 81 having one input directly connected to input terminal 14 and another input connected to terminal 14 through an inverting delay unit 82. Basically, when the midphase encoded data applied to terminal 14 is at logic 1 level, the output of unit 82 is a logic 0, while the other input to gate 81 is a logic 1. Consequently, the output from gate 81 is at a logic 0 level as represented by numeral 83 in line *e*, FIG. 2. However, as a 1 to 0 transition occurs in the midphase encoded data, for a very brief period determined by the delay of unit 82, both inputs to gate 81 are logic 0's. Consequently, the output from gate 81 becomes a logic 1, as represented by a C pulse. The duration of each C pulse is determined by the delay of unit 82. As previously indicated, this duration is less than ½ bit time and is less than the combined delay produced by generator 35 and unit 36 in response to the leading edge of each C pulse.

Transition detector 16 is similar to detector 12 in that it includes a NOR gate 85 and an inverting delay unit 86. As long as the data applied to terminal 18 is at a logic 1 level, the output of gate 85 is at a logic 0 level. However, as a 1 to 0 transition occurs in the data at terminal 18, both inputs to gate 85 are logic 0's for a short duration of time as determined by unit 86. Consequently, a short duration CC output pulse id provided by gate 85.

The bit time pulse generator 35 is shown comprising an AND gate 91 whose two inputs receive the output signals from gates 31 and 32. The output from gate 91 is applied to the inverting (−) input to a push/pull unit 92, and is also applied through an inverter 93 to the non-inverting (+) input to unit 92.

As long as no 1 to 0 transition is sensed by either detector 12 or 16, the output from both detectors is a logic 0. Consequently, when gates 31 and 32 are enabled by a logic 1 from unit 36, each of the gates 31 and 32 supplies a logic 1 input to AND gate 91. The output from AND gate 91 is a logic 1 which, when inverted by unit 92, supplies a logic 0 to unit 36 which in turn inverts it to provide an enabling logic 1 to the NAND gates 31–34.

However, as soon as a 1 to 0 transition is detected by one of the detectors 12 or 16, the detector provides a logic 1 output, which causes the NAND gate 31 or 32 to which it is connected to provide a logic 0 output. Consequently, Attention is now directed to FIG. 5 which is a schematic circuit diagram of the system 10 of FIG. 1 except for the clock pulse generator 70. The system is shown as implemented with a minimum number of MOS elements and resistors, thereby lending itself to fabrication with integrated circuit techniques. The entire system can be produced on a single semiconductor chip which occupies a minimum volume and is AND gate 91 provides a logic 0 output, and the output from unit 92 becomes a logic 1 which propagates through unit 36 to provide a disabling logic 0 signal to the NAND gates 31–34. After the trailing edge of an output pulse from one of the detectors 12 or 16 occurs, AND gate 91 again provides a logic 1 signal to unit 92 which in turn provides a logic 0 level. Unit 36 is thus caused to provide a logic 1 output after a delay of more than ½ bit period and less than 1 bit period.

As seen from FIG. 4, FF40 comprises a pair of interconnected NOR gates 95 and 96. The clock pulse generator 70 is shown comprising a first section consisting of a push/pull unit 97 with its inverting (−) input connected through a delay unit 98 to the output of unit 92 which is also tied to the non-inverting (+) input to unit 97 through an inverter 99.

The output from push/pull unit 97 is the clock pulses (CP's). A second section of the generator 70 includes a push/pull unit 100 which is employed to provide the complement clock pulses $\overline{CP}$. The non-inverting (+) input to unit 100 is connected to unit 92 through a delay unit 101, while the inverting (−) input is connected to the output of inverter 99.

Figure 5:
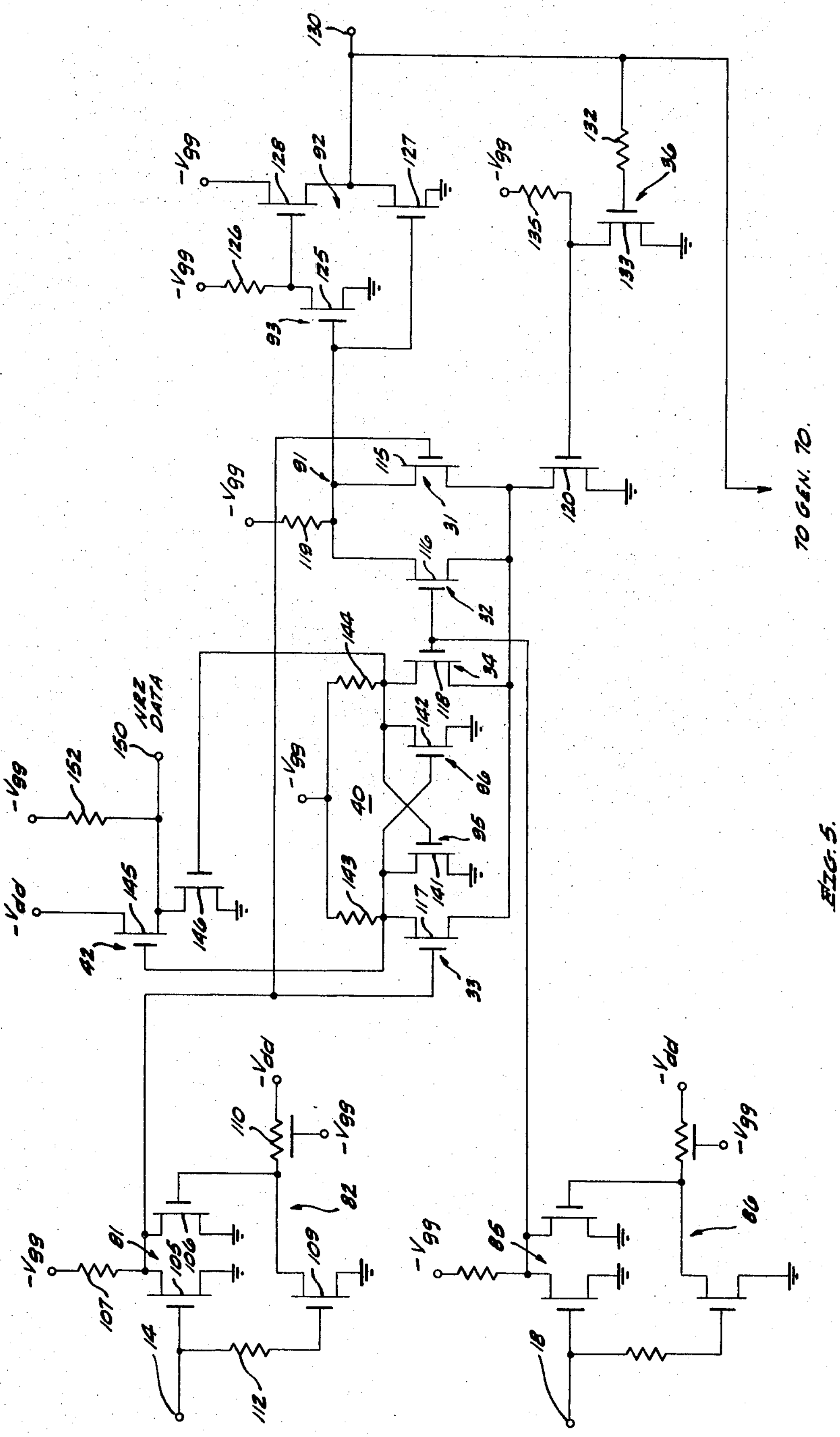
FIG. 5 is a schematic circuit diagram of the system of FIG. 1 except for the clock pulse generator.

Attention is now directed to FIG. 5 which is a schematic circuit diagram of the system 10 of FIG. 1 except for the clock pulse generator 70. The system is shown as implemented with a minimum number of MOS elements and resistors, thereby lending itself to fabricating with integrated circuit techniques. The entire system can be produced on a single semiconductor chip which occupies a minimum volume and is extremely light. As shown in FIG. 5, NOR gate 81 of the transition detector 12 consists of two parallel connected MOS elements 105 and 106 and a resistor 107 which is connected between the drain electrodes of the two MOS elements 105 and 106 and a terminal supplying a potential $-V_{gg}$, which may be −26 volts, for example.

The source electrodes of the elements 105 and 106 are connected to ground, while the gate electrode of MOS element 105 is connected to input terminal 14. Inverting delay unit 82 is shown as comprising a MOS element 109 having a source electrode connected to ground and a drain electrode connected to the gate electrode of MOS element 106. The drain electrode of element 109 is also connected via a resistive device 110 to a terminal supplying a potential $-V_{dd}$ which may be −13 volts, for example. Resistive device 110 may take the form of a MOS element whose gate electrode is connected to a terminal supplying the potential $-V_{gg}$. The gate electrode of MOS element 109 is connected to input terminal 14 through a resistor 112.

Resistor 112 may be provided by a diffused P-type conductivity region in the semiconductor substrate on which the integrated circuit is formed. The capacitance provided by the diffused P region and the input capacitance at the gate electrode of MOS element 109, together with the resistance of the diffused resistor 112 result in a distributed RC delay line. Thus, whereas MOS element 109 would act merely as an inverter in the absence of resistor 112, by incorporating the resistor 112 into the circuit, inverting delay line 82 is provided. Transition detector 16 may be implemented in a manner identical to that of detector 12 and, therefore, will not be discussed in any further detail.

In FIG. 5, the four NAND gates 31–34 are shown to comprise respective MOS elements 115–118. The drain electrodes of the elements 115 and 116 are connected together and via a resistor 119 to a terminal supplying the potential $-V_{gg}$, while the source electrodes of the elements 115 and 116 are connected to the drain electrodes of a MOS element 120 whose source electrode is connected to ground. The drain electrode of MOS element 120 is also connected to the respective source electrodes of MOS elements 117 and 118. When MOS element 120 is rendered conductive of current, essentially ground potential is applied to the source electrodes of elements 115, 116, 117 and 118, thereby enabling the NAND gates 31, 32, 33 and 34. The respective gate electrodes of MOS elements 115 and 117 are connected to the output of NOR gate 81 of detector 12, while the respective gate electrodes of elements 116 and 118 are connected to the output of NOR gate 85 of detector 16.

The output signals from NAND gates 31 and 32, as well as from AND gate 91, appear at the junction point between MOS elements 115 and 116 and resistor 119. This junction point is designated by numeral 91 since it represents gate 91 in the actual wired circuit. Assuming that the NAND gates 31 and 32 are enabled, i.e., a logic 1 is present at the gate electrode of MOS element 120, junction point 91 is at a logic 1 level as long as the levels applied to the gate electrodes of both elements 115 and 116 are at logic 0 levels, which is the case in the absence of the detection of a 1 to 0 transition. However, as soon as such a transition is detected, a logic 1 level is applied to the gate electrode of one of elements 115 and 116, the associated element 115 or 116 becomes conductive of current, and junction point 91 is caused to reside at essentially ground potential, which is representative of a logic 0.

Junction point 91 is connected to the gate electrode of a MOS element 125 which together with a series connected MOS element 128 having its gate electrode connected to the drain electrode of MOS element 125 forms the push/pull unit 92. The output signal from push/pull unit 92 is furnished at terminal 130. Briefly, when junction point 91 is at a logic 1 level, the gate electrodes of elements 127 and 128 reside at logic levels 1 and 0, respectively. Consequently, terminal 130 is at essentially ground potential (a logic 0). On the other hand, when the junction point 91 is at a logic 0 level, the gate electrodes of elements 127 and 128 are at levels 0 and 1, respectively. Consequently, output terminal 130 is at essentially the negative potential, $-V_{gg}$, which is representative of a logic 1.

Output terminal 130 of unit 92 is connected to delay unit 36 which activates MOS element 120. Delay unit 36 includes a resistor 132 which is connected between terminal 130 and the gate electrode of a MOS element 133. The source electrode of element 133 is grounded, while the drain electrode is connected to the gate electrode of MOS element 120 and also to a $-V_{gg}$ terminal through a resistor 135. Resistor 132 may be a diffused resistor which provides sufficient capacitance together with the gate input capacitance of element 133 to serve as an C delay line. This delay line, together with the delay provided by the elements 115, 116, 125, 127, 128 and 133, provides the proper delay to disable the NAND gates 31–34 for the desired time periods. These delays will be discussed in further detail in connection with FIG. 7.

As shown in FIG. 5, the NOR gates 95 and 96 which form the data FF40 comprise MOS elements 141 and 142 respectively, having their respective drain electrodes connected to the drain electrodes of elements 117 and 118, respectively. A resistor 143 is connected between the drain electrodes of elements 117 and 141 and a terminal supplying the potential $-V_{gg}$, while a similar resistor 144 connects the drain electrodes of elements 118 and 142 with the $-V_{gg}$ terminal. The drain electrodes of elements 117 and 141 are also connected to the gate electrode of a MOS element 145, which together with a series connected MOS element 146 forms the push/pull output unit 42. The gate electrode of MOS element 146 is connected to the drain electrodes of elements 118 and 142. The junction between the source electrode of element 145 and the drain electrode of element 146 is connected to an NRZ data output terminal 150 and to a $-V_{gg}$ supplying terminal through a resistor 152. The drain electrode of MOS element 145 is connected to a terminal furnishing the voltage $-V_{dd}$, while the source electrode of element 146 is connected to ground. When FF40 is set by a logic 1 level at the gate electrode of element 117, so that essentially ground potential is applied to the gate electrode of element 142, the gate electrode of element 146 resides at essentially $-V_{gg}$ causing terminal 150 to be essentially grounded (representing a binary 0). On the other hand, when FF40 is reset by a logic 1 level at the gate electrode of element 118, the gate electrode of element 141 is at a logic 0 level, causing element 145 to be conductive and terminal 150 to reside at a potential of essentially $-V_{dd}$ (representing a binary 1).

From the foregoing description it should be appreciated that in accordance with the present invention the system 10 is implementable with a minimum number of MOS elements. Necessary delays in the transition detectors 12 and 16 and in the delay unit 36 may be achieved by diffused resistors in series with the gate electrodes of the MOS elements. Each diffused resistor, in addition to providing a desired resistance value, has distributed capacitance which together with the stray input capacitance of the associated MOS element acts as a distributed RC delay line. The system shown in FIG. 5 has been operated at a bit rate of 5Mc to regenerate NRZ data. The pulses at the output (terminal 130) of the bit time pulse generator 35 which are used by the clock pulse generator 70 will be further described hereafter.

Figure 6:
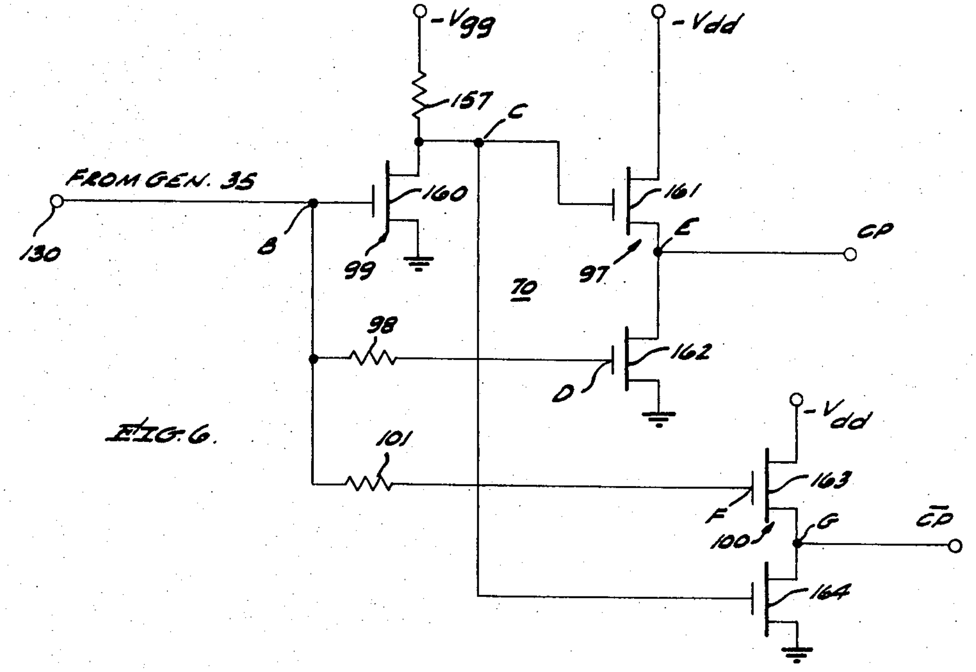
FIG. 6 is a schematic circuit diagram of the clock pulse generator of the system of FIG. 1.

As shown in FIG. 6, the inverter 99 in the generator 70 consists of a MOS element 160 whose drain electrode is connected to a $-V_{gg}$ supplying terminal through resistor 157 which may be of the variable type. The delay lines 98 and 101 are provided by resistors 98 and 101 (which are preferably diffused P-type region resistors), while the push/pull units 97 and 100 each consist of a pair of series connected MOS elements 161 and 162, and 163 and 164, respectively.

As previously pointed out, the basic function of the generator 70 is to provide CP and $\overline{CP}$ pulses whose clocking levels do not overlap in time in order to insure that register 72 (FIG. 1) is not clocked by both simultaneously. The operation of the generator 70 will now be explained in conjunction with the waveforms shown in FIG. 3.

Line *a* of FIG. 3 shows square pulses 51–53 provided by the bit time pulse generator 35, each b–having a 50 percent duty cycle. Lines *b—f* depict the waveforms at respective points *B–F* in FIG. 6. Actually the waveform at point E is the CP waveform. The waveform at point G is the $\overline{CP}$ waveform, the CP waveform being superimposed in dashed lines on the $\overline{CP}$ waveform in line *g* of FIG. 3.

The square shape of pulses 51–53 in line *a* of FIG. 3 is idealized. In practice the shape of the pulses is as shown in line *b*. As may be seen, the fall time of the pulse from the 0 level to the 1 level is much greater than the rise time from the 1 level to the 0 level. The reason for this is as follows. When a typical MOS element used in the system of FIG. 1 is non-conductive, or off, its output is represented by the logic 1 level. Consequently, when the MOS element is rendered conductive, its stray capacitance is discharged through the low resistive path provided by the element and, therefore, the output reaches the logic 0 level in a relatively short time. However, when the element is rendered non-conductive by an appropriate potential level applied to its gate electrode, the stray capacitance must charge to the ultimate potential through a relatively large resistor, such as resistor 126 in FIG. 5. Consequently, a longer time period elapses before the capacitance becomes changed to the logic 1 level. Thus, the actual time that pulses 51–53 are present is less than the periods between these pulses. In lines *b–g* of FIG. 3 the horizontal dashed lines designate threshold levels below which the waveforms activate the various gates to which they are applied.

As shown in lines *b* and *c* of FIG. 3, as each of the pulses (such as pulse 51) at point B drops from the 0 level below its threshold level, MOS element 160 is rendered conductive, and the potential level at the drain electrode of MOS element 160 (point C) rises at a fairly high rate (due to the low resistive path to ground through element 160 when element 160 becomes conductive). When pulse 51 crosses the threshold level while rising from the 1 level to the 0 level, it renders MOS element 160 non-conductive, enabling the stray capacitance between point C and ground to charge to essentially the potential $-V_{gg}$. However, since this capacitance is charged through relatively large resistor 157, the time required for the charging is relatively long, as shown by the curved pulse portions 181–183 in line *c*.

As shown in FIG. 6, points B and D are connected through resistor 98. The function of resistor 98 is to delay the arrival at point D of each pulse from point B. As seen from line *d* of FIG. 3, the potential level at point D starts to drop as the level at point B begins to drop. However, the rate at which the potential at point D drops is slower than that for the potential at point B, as may be seen from waveform portions 191–193. Similarly, as the potential level at point B rises the potential at point D also rises, but at a slower rate, as shown by waveform portions 194–196.

From a careful comparison of lines *c* and *d* it may be seen that during each cycle there exists a very small time period during which the levels at points C and D are below their respective threshold levels simultaneously. During each such interval MOS elements 161 and 162 are both conductive. These intervals are designated in line *d* by areas 201, 202 and 203. When MOS elements 161 and 162 are both conductive, the terminal supplying the potential $-V_{dd}$ is connected to ground through the low resistance paths through these two MOS elements. Thus, to minimize the power drain the values of resistors 157 and 98 are chosen, and the various resistances provided by the MOS elements are selected, so as to minimize the time intervals during which the MOS elements 161 and 162 are conductive simultaneously.

The potential level at point E is a function of the conductive condition of MOS elements 161 and 162. In practice, as shown in line *e* of FIG. 3, point E is at a logic 0 level (ground) until the potential at point D rises above the threshold level for MOS element 162 while the potential at point C is below the threshold level for MOS element 161. Under the latter conditions MOS element 162 is non-conductive and element 161 is conductive, enabling the potential at point E to drop toward the logic 1 level, as shown in line *e*. Therein, two complete CP's are designated as 205 and 206.

As seen from FIG. 6, point F is connected to point B through resistor 101. This resistor performs the same delay function as that performed by resistor 98. However, resistor 101 is chosen to provide less delay than that provided by resistor 98. Consequently, the rates at which the level at point F varies from the 0 level to the 1 level and from the 1 level to the 0 level are greater than the rates of the potential level changes at point D. This is represented in line *f* by the increased steepness of the slope of waveform portions 211–213 as compared with that of respective waveform portions 191–193 of line *d*, and by the increased steepness of the slope of waveform portions 214–216 as compared with that of waveform portions 194–196, respectively.

The potential level at point G depends upon the potentials at points F and C which control MOS elements 163 and 164, respectively. The potential at point G starts dropping from the 0 level to the 1 level when the potential at point C is below the threshold level for MOS element 164 and the potential at point F drops below the threshold level for MOS element 163. It should be pointed out that since the source electrodes of MOS elements 162 and 164 reside at ground potential, while the source electrodes of elements 161 and 163 follow the respective output voltages, the gain of MOS elements 161 and 163 is lower than that of respective elements 162 and 164 for identical device sizes. This guarantees that the CP and $\overline{CP}$ logic 1 levels are of shorter duration than the logic 0 levels. This is required to insure that the clock pulses do not overlap below the threshold level.

In line *g* of FIG. 3 the CP's 205 and 206 are superimposed in dashed lines on the $\overline{CP}$'s 221 and 222. Thus, it becomes apparent that hardly any overlap exists between the CP's and the $\overline{CP}$'s produced by the clock pulse generator of the present invention. This is particularly true below the threshold level which the pulses must exceed in order to activate or clock the various elements in the register 72 (see FIG. 1). Indeed, as seen from line *g*, a finite time exists between each CP and the following $\overline{CP}$ or between each $\overline{CP}$ and the following CP, thereby insuring that at no time are clocking levels present simultaneously on tooth clocking lines.

From the foregoing it should be apparent that in accordance with the present invention a novel clock pulse generator is provided which incorporates MOS elements to produce CP's and $\overline{CP}$'s with no time overlap between the two pulses. The generator includes two push/pull units, each comprising two serially connected MOS elements, an inverter MOS element whose drain electrode is connected to a potential supply terminal through a resistor, and two additional resistors which provide slightly different delays of a generator activating pulse which is also applied to the inverter MOS element.

Figure 7:
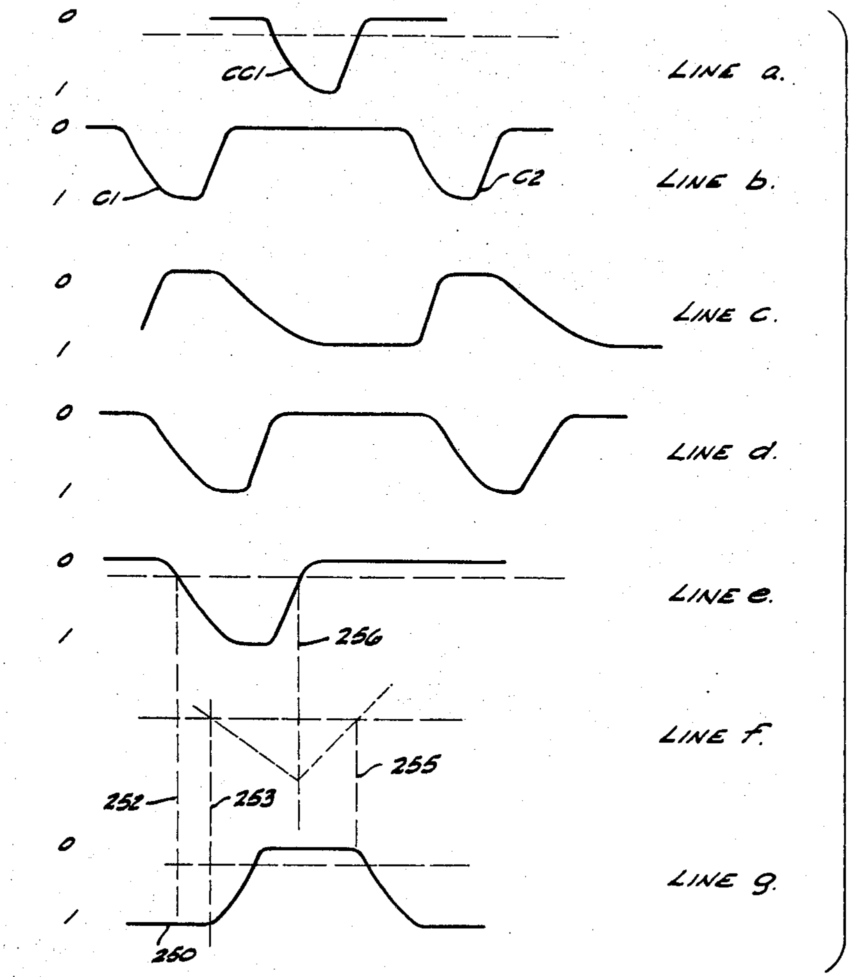
FIG. 7 shows timing waveforms at various points in the circuitry of FIG. 5.

Attention is now directed to FIG. 7 which will be used to explain the delay provided by the various MOS elements of the generator 35 and the delay unit 36 in order to inhibit the NAND gates 31–34 so that undesired pulses, such as CC1 and C5 (FIG. 2), do not active the system. In FIG. 7, line a illustrates pulse CC1, line *b* shows pulses C1 and C2, while line *c* depicts the waveform at the junction point 91 (FIG. 5). Line *d* shows the waveform at the drain electrode of MOS element 125, while line *e* illustrates the potential level at output terminal 130 (FIG. 5). Line *f* is used in explaining the delay provided by diffused resistor 132, while line *g* shows the waveform at the gate electrode of MOS element 120. In lines *a–g* of FIG. 7 the horizontal dashed lines designate threshold levels.

Assume that the gate electrode of MOS element 120 is at a logic 1 level, as designated by 250 in line *g*, so that all the NAND gates 31–34 are enabled. When the trailing edge of pulse C1 falls below the threshold level it renders MOS element 115 conductive. Consequently, the potential at junction point 91 rises toward the 0 level (line *c*). As this potential rises above the threshold level for MOS element 125, element 125 is rendered non-conductive. Consequently, the potential at its drain electrode drops toward the 1 level. As this potential crosses the threshold level for MOS element 128, element 128 is rendered conductive so that the potential at terminal 130 drops toward the 1 level (line *e*).

As shown in FIG. 5, terminal 130 is connected to the gate electrode of MOS element 133 through resistor 132, the function of which is to delay the signal terminal 130. In the absence of resistor 132 the potential at the drain electrode of MOS element 133 would start to rise toward the 0 level when the potential at terminal 130 drops below the threshold level, as indicated by dashed lines 252. However, due to resistor 132, the change in conductive condition of element 133 is delayed so that the commencement of the rise in potential at the drain electrode of element 133 to the 0 level does not occur until the time designated by the dashed line 253.

As seen from FIG. 7, the potential at the drain electrode of MOS element 133 rises above the threshold level before the start of the leading edge of pulse CC1. Consequently, when the leading edge of pulse CC1 arrives at NAND gates 32 and 34, the NAND gates are already disabled. In practice, since pulse CC1 occurs exactly ½ bit time after pulse C1, the delay provided by the MOS elements and resistor 132 is chosen so that the potential at the gate electrode of MOS element 120 rises above the threshold level (line *g*) not less than ½ bit time after pulse C1 drops below its threshold level (line *b*). Consequently, the NAND gates 31–34 are disabled when pulse CC1 falls below its threshold level (line *a*).

The trailing edge of pulse C1 rises above its threshold level while the NAND gates 31–34 are still enabled, i.e., the potential at the gate electrode of MOS element 120 is still below the threshold level (line *g*). Consequently, the trailing edge of pulse C1 affects the potential at point 91, as shown in line *c*, which in turn affects the potential at the drain electrode of MOS element 125, as shown in line *d*. The latter potential in turn affects the potential at output terminal 130, as shown in line *e*. Due to the delay provided by resistor 132, in response to a rise in the potential at terminal 130 above the threshold level, the potential at the drain electrode of MOS element 133 does not commence falling to the 1 level until the time designated by dashed line 255 (rather than the time designated by line 256).

Here again, the MOS elements and resistor 132 are designed so that the potential at the gate electrode of MOS element 120 falls below the threshold level at least ½ bit time after the trailing edge of pulse C1 rises above its threshold level. Consequently, since the trailing edge of pulse CC1 rises above its threshold level exactly ½ bit time after the trailing edge of pulse C1 rises above its threshold level, the trailing edge of pulse CC1 rises above its threshold level before the NAND gates 31–34 are enabled. From the foregoing it may be seen that the four NAND gates 31–34, the pulse generator 35, and the delay unit 36 provide delays so that each pulse received from the transition detectors 12 and 16 (except for pulses such as CC1 and C5 which follow a preceding pulse by ½ bit time rather than by a full bit time) passes through the appropriate gates to the pulse generator 35 and to the data flip-flop 40.

Although a particular embodiment of the invention has been described and illustrated in detail herein, it is recognized that modifications and variations may readily occur to those skilled in the art which nevertheless lie within the spirit, scope and contemplation of the invention.

We claim

1. A system for providing a sequence of pulses synchronized with mid bit times of split phase Manchester encoded binary data, wherein each bit of binary 1 value is represented by a mid bit time transition from a logic 1 level to a logic 0 level, and each bit of binary 0 value is represented by a mid bit time transition from a logic 0 level to a logic 1 level, and wherein a logic level transition is also present at the time between successive bit times associated with bits having the same binary value, comprising:

first transition detector means for receiving split phase Manchester encoded binary data and for providing a pulse for each logic 1 level to logic 0 level transition therein;

second transition detector means for receiving the complement form of said split phase Manchester encoded binary data and for providing a pulse for each logic 1 level to logic 0 level transition therein;

a plurality of control gates, each including a metal oxide semiconductor field effect transistor and each coupled to one of said first and second transition detector means;

pulse generating means, including delay means, coupled to said control gates to control said control gates to provide output pulses which correspond to the pulses produced by said first and second transition detector means in response to transitions occurring only at the mid bit times of said Manchester encoded binary data;

said pulse generating means including means responsive to each pulse provided by said first or said second transition detector means as a result of a mid bit time transition for inhibiting said control gates during the duration of each pulse provided by said first or said second transition detector means in response to a transition at the time between successive bit times associated with bits having the same binary value; and said delay means including a metal oxide semiconductor field effect transistor having a source electrode, a drain electrode and a gate electrode, said drain electrode being resistively coupled to a first power supply terminal, said source electrode being coupled to a second power supply terminal, and resistive means coupled to the gate electrode of said field effect transistor for delaying the application to said gate electrode of pulses derived from the pulses provided by said first or said second transition detector means as a result of mid bit time transitions.

2. A data converting system comprising:

first input means for receiving split phase Manchester encoded binary data having a first waveform wherein each bit of a first value is represented by a transition from a first logic level to a second logic level at mid bit time and each bit of a second value is represented by a transition from said second logic level to said first logic level at mid bit time, said first waveform further including level transitions at the time between successive bit times associated with bits having the same value;

second input means for receiving a second waveform complementary to said first waveform;

a first transition detector for providing a first pulse for each transition from said first level to said second level in said first waveform;

a second transition detector for providing a second pulse for each transition from said first level to said second level in said second waveform;

bistable means;

control means, including pulse generating means and delay means, responsive to said first and second pulses for driving said bistable means to a first stable state in response to each first pulse from said first transition detector which occurs more than one-half bit time after the occurrence of the most recent second pulse from said second transition detector and for driving said bistable means to a second stable state in response to each second pulse which occurs more than one-half bit time after the occurrence of the most recent first pulse from said first detector; and said control means including first, second, third and fourth gates, each having a control input connected to the output from said delay means, means connecting the output of said first detector to another input of each of said first and third gates, means connecting the output of said second detector to another input of each of said second and fourth gates, each gate providing an output pulse in response to a pulse supplied thereto on its said another input only when its control input is at an enabling level, means for applying the output from said first and second gates to said pulse generating means to provide an output pulse in response to a pulse from either said first or second gate, and means for applying each output pulse from said pulse generating means to said delay means to apply to the control input of each of said gates a disabling level for a period of time not less than one-half bit time.

3. The system as recited in claim 1 wherein said resistive means includes a diffused resistive region in the semiconductor substrate on which said field effect transistor is formed.

4. The system as recited in claim 1 wherein the drain electrode of the field effect transistor of one of said control gates is coupled to the drain electrode of the field effect transistor of another of said control gates and the source electrode of the field effect transistor of said one of said control gates is coupled to the source electrode of the field effect transistor of said another of said control gates, the gate electrode of the field effect transistor of said one of said control gates being coupled to said first transition detector means, the gate electrode of the field effect transistor of said another of said control gates being coupled to said second transition detector means, and wherein a resistor is coupled between the intercoupled drain electrodes and said first power supply terminal, and the source-drain path of a further metal oxide semiconductor field effect transistor is coupled between the intercoupled source electrodes and said second power supply terminal, the gate electrode of said further field effect transistor being coupled to the drain electrode of the field effect transistor of said delay means.

5. The system as recited in claim 4 wherein said pulse generating means includes first, second and third metal oxide semiconductor field effect transistors each having a source electrode, a drain electrode and a gate electrode, the gate electrodes of said first and said third field effect transistors being coupled to the intercoupled drain electrodes of the field effect transistors of said one and said another control gates, the source electrodes of said first and third field effect transistors being coupled to said second power supply terminal, a resistor coupled between the drain electrode of said first field effect transistor and said first power supply terminal, the gate electrode of said second field effect transistor being coupled to the drain electrode of said first field effect transistor, the drain electrode electrode of said second field effect transistor being coupled to said first power supply terminal, the source electrode of said second field effect transistor being coupled to the drain electrode of said third field effect transistor and to a terminal of said resistive means electrically remote from the gate electrode of the field effect transistor of said delay means.

6. The system as recited in claim 4 wherein the source electrode of the field effect transistor of a third of said control gates is coupled to the source electrode of the field effect transistor of a fourth of said control gates, the drain electrodes of the field effect transistors of said third and fourth control gates each being resistively coupled to said first power supply terminal, the gate electrode of the field effect transistor of said third control gate being coupled to said first transition detector means, the gate electrode of the field effect transistor of said fourth control gate being coupled to said second transition detector means, and the intercoupled source electrodes of the field effect transistors of said third and fourth control gates being coupled to the drain electrode of the field effect transistor of said delay means.

7. The system as recited in claim 6 and further comprising: a bistable circuit including two interconnected metal oxide semiconductor field effect transistors, one input to said bistable circuit being coupled to the drain electrode of the field effect transistor of said third control gate and the other input to said bistable circuit being coupled to the drain electrode of the field effect transistor of said fourth control gate.

8. The system as recited in claim 1 wherein each of said transition detector means comprises: a pair of metal oxide semiconductor field effect transistors and an additional metal oxide semiconductor field effect transistor, the respective drain electrodes of said pair of transistors being coupled together and the respective source electrodes of said pair of transistors being coupled together, a resistor coupled between the drain electrodes of said pair of transistors and said first power supply terminal, the source electrodes of said pair of transistors and of said additional transistor being coupled to said second power supply terminal, the gate electrode of one of said pair of transistors being coupled to the drain electrode of said additional transistor and being resistively coupled to a third power supply terminal, an input terminal coupled to the gate electrode of the other of said pair of transistors and coupled via resistive delay means to the gate electrode of said additional transistor, and means for coupling the drain electrodes of said pair of transistors to at least one of said control gates.

9. The system as recited in claim 2 wherein said delay means includes a metal oxide semiconductor field effect transistor having a source electrode, a drain electrode and a gate electrode, said drain electrode being resistively coupled to a first power supply terminal and to the control input to said first, second, third and fourth gates, said source electrode being coupled to a second power supply terminal, and a resistor coupled between said gate electrode and the output of said pulse generating means.

10. The system as recited in claim 9 wherein each of said first, second, third and fourth gates includes a metal oxide semiconductor field effect transistor having a source electrode, a drain electrode and a gate electrode, the source electrodes of each of said field effect transistors being coupled together, the drain electrodes of each of said field effect transistors being coupled to said first power supply terminal, the gate electrodes of the field effect transistors of said first and third gates being coupled to the output of said first detector, the gate electrodes of the field effect transistors of said second and fourth gates being coupled to the output of said second detector, and wherein the source-drain path of a further metal oxide semiconductor field effect transistor is coupled between the intercoupled source electrodes and said second power supply terminal, the gate electrode of said further field effect transistor being coupled to the drain electrode of the field effect transistor of said delay means.

* * * * *

PO-1050
(5/69)

UNITED STATES PATENT OFFICE
CERTIFICATE OF CORRECTION

Patent No. 3,659,286 Dated April 25, 1972

Inventor(s) Carroll R. Perkins et al

It is certified that error appears in the above-identified patent and that said Letters Patent are hereby corrected as shown below:

Col. 3, line 12, delete "/" before "disabled".
Col. 5, line 15, after "at" insert --a--;
line 34, "id" should be --is--;
line 54, after "Consequently" insert --AND gate 91 provides a logic 0 output, and the output from unit 92 becomes a logic 1 which propagates through unit 36 to provide a disabling logic 0 signal to the NAND gates 31-34. After the trailing edge of an output pulse from one of the detectors 12 or 16 occurs, AND gate 91 again provides a logic 1 signal to unit 92 which in turn provides a logic 0 level. Unit 36 is thus caused to provide a logic 1 output after a delay of more than 1/2 bit period and less than 1 bit period.

As seen from Figure 4, FF40 comprises a pair of interconnected NOR gates 95 and 96. The clock pulse generator 70 is shown comprising a first section consisting of a push/pull unit 97 with its inverting (-) input connected through a delay unit 98 to the output of unit 92 which is also tied to the non-inverting (+) input to unit 97 through an inverter 99. The output from push/pull unit 97 is the clock pulses (CP's). A second section of the generator 70 includes a push/pull unit 100 which is employed to provide the complement clock pulses $\overline{CP}$. The non-inverting (+) input to unit 100 is connected to unit 92 through a delay unit 101, while the inverting (-) input is connected to the output of inverter 99.--

Col. 5, cancel lines 55-75 in their entirety.

Col. 6, lines 1-6, delete in their entirety;
line 11, "fabricating" should be --fabrication--.
Col. 7, line 27, "C" should be --RC--.
Col. 8, line 15, after "square" insert --shaped--.

Continued on attached sheet

PO-1050
(5/69)

UNITED STATES PATENT OFFICE
CERTIFICATE OF CORRECTION (CONTINUATION

Patent No. 3,659,286 Dated April 25, 1972 - 2 -

Inventor(s) Carroll R. Perkins et al

It is certified that error appears in the above-identified patent and that said Letters Patent are hereby corrected as shown below:

Col. 9, line 70, "active" should be --activate--.
Col. 12, line 18, before "second" insert --said--;
line 58, delete the second "electrode".

Signed and sealed this 20th day of March 1973.

(SEAL)
Attest:

EDWARD M.FLETCHER,JR.
Attesting Officer

ROBERT GOTTSCHALK
Commissioner of Patents